Oct. 28, 1952 T. M. BLACKMON ET AL 2,615,330
WEIGHT AND BALANCE INDICATOR
Filed Nov. 13, 1945 4 Sheets-Sheet 1

INVENTOR.
TRUETT M. BLACKMON
FIRMIN D. PORTER
BY
Edwin Coates
ATTORNEY

Oct. 28, 1952

T. M. BLACKMON ET AL 2,615,330

WEIGHT AND BALANCE INDICATOR

Filed Nov. 13, 1945

INVENTOR.
TRUETT M. BLACKMON
FIRMIN D. PORTER
BY
Edwin Coates
ATTORNEY

Oct. 28, 1952  T. M. BLACKMON ET AL  2,615,330
WEIGHT AND BALANCE INDICATOR

Filed Nov. 13, 1945  4 Sheets-Sheet 3

INVENTOR.
TRUETT M. BLACKMON
FIRMIN D. PORTER
BY
J. Edwin Coates
ATTORNEY

INVENTOR.
TRUETT M. BLACKMON
FIRMIN D. PORTER
BY Edwin Coates
ATTORNEY

Patented Oct. 28, 1952

2,615,330

UNITED STATES PATENT OFFICE 2,615,330

WEIGHT AND BALANCE INDICATOR

Truett M. Blackmon, Sherman Oaks, and Firmin D. Porter, Venice, Calif., assignors to Douglas Aircraft Company, Inc., Santa Monica, Calif.

Application November 13, 1945, Serial No. 628,190

8 Claims. (Cl. 73—65)

This invention relates to apparatus for indicating the weight and balance conditions of a vehicle as they change during the loading of the vehicle.

Devices of this general type are particularly useful in aircraft, for indicating at some suitable station, such as the pilot's cockpit or the baggage compartment, such loading-induced variables as the total weight of the aircraft, the longitudinal location of its center of gravity, or the weight on each of the landing wheels thereof for purposes of comparison. It is to be understood, however, that the present invention is by no means limited in the scope of its utility to employment with aircraft, being equally well applicable to automobiles and other conveyances as will become apparent hereinafter.

Previous devices of this general nature, and particularly those employed in connection with aircraft, are constructed to operate in response to loading-induced motions of, or pressure changes in, certain hydraulic components, such as the landing gear struts. Due to the alternate binding and releasing action of their packing glands and the variable behavior of the fluid in the struts, these motions are not linearly proportional to the load changes nor immediately responsive thereto, instead being discontinuous and quite jerky. The motivating force for actuating the indicating component of the apparatus hence being erratic, such apparatus is unpredictable and unreliable in operation.

Prior devices employing electrical means for effecting indication of the loading-induced variables of a vehicle are usually quite complex and delicate and hence unreliable.

It is the general object of this invention to provide a vehicle loading-indicating device which will be directly and continuously responsive to deflections of those structural components of the vehicle's ground-engaging members which undergo movement in direct linear proportion to the increments in loading of the vehicle, whereby immediate and continuous indication will be made of the changing weight and balance conditions effected by loading the vehicle.

It is a particular object of the invention to provide a device including relatively simple and reliable electrical means for electrically measuring the deflections of those components of the ground-engaging gear of vehicles which deflect linearly proportionately to the increments of loading on the vehicle, by causing them to actuate electrical indicating means, responsive to relative changes of electromagnetic fields associated with said load-deflectable components. The indicating means of the device may be constructed and calibrated as a single device for quantitatively evaluating changes in the weight and the longitudinal position of the center of gravity of the vehicle during loading, or may consist of separate indicators enabling mutual comparisons to obtain these values.

It is a specific object of the invention to provide a directly readable aircraft loading indicator which will be directly and immediately responsive to the flexures of the axles of the landing wheels of the aircraft. Independence from the relatively erratic actuating force furnished by movement of, or pressure changes in, such variably responsive means as hydraulic struts, or the like, is thus assured while enabling rapid and accurate indication of the total weight of the aircraft, or the longitudinal position of the center of gravity thereof; or the weight loading on each landing leg.

A further particular object of the invention is to provide a loading-indication device of this improved nature, the calibration of which will remain dependable without recalibration for relatively long periods of time.

Still another particular object is to provide an indicating device of this type which will be substantially independent of the ground attitude of the craft or of side thrusts on the landing gear, and of thermal effects due either to altitude or climate.

Another particular object of the invention is to provide a device of this improved nature which will be relatively simple in construction and easy to install on the vehicle in a permanent location with all its parts carried in the vehicle.

With these and other objects in view, the invention essentially includes, in one of its presently preferred embodiments, a flexural element in each ground-engaging member of the vehicle, load-deflectable in linear proportion to increments of loading of the vehicle and changing the position of the armature of an electromagnetic displacement device associated with each ground-engaging member, the displacement device constituting one-half of a balanced bridge connected to the vehicle's energy source and to the other half of the bridge, the armature therefore functioning to unbalance the bridge. The output voltages of the thus unbalanced bridges are sensitivity equalized and inductively impressed upon one electrical side or the other, depending upon the indication sought, of a null-point sensitive volt meter, nullable on the other electrical side by a potentiometer energizable from the vehicle's energy source and mechanically connected to a dial calibrated in pounds to indicate loading and in percentages of the M. A. C. for indicating longitudinal positions of the center of gravity. The outputs of the bridges are rendered connectible to the volt meter and to the potentiometer in two different circuits, one of which effects addition in phase of the voltage outputs of the bridges to give an indication of the total weight, the other circuit effecting a bridge-ratio comparison of the voltage outputs from the forwardly located ground-engaging members and the rearwardly located ground-engaging members in such a way as to indicate the longitudinal position of the center of gravity of the vehicle. If desired, the voltage-responsive indicating devices may be separate and the readings from the forwardly located wheel or wheels compared by the vehicle operator to those from the rearwardly located wheels to obtain an evaluation of the longitudinal position of the center of gravity of the vehicle; or they may be added by him to indicate the total loading.

The invention also provides novel methods of ascertaining the loading of a vehicle and the longitudinal position of its center of gravity.

The other objects and accomplishments of the invention will be made manifest as this specification proceeds.

The invention is illustrated in the accompanying drawings, and described hereinafter, in connection with its embodiment in airplanes, but it is to be understood that the inventive concepts are limited in the embodiments they can assume, only by the scope of the annexed claims.

Figure 1:
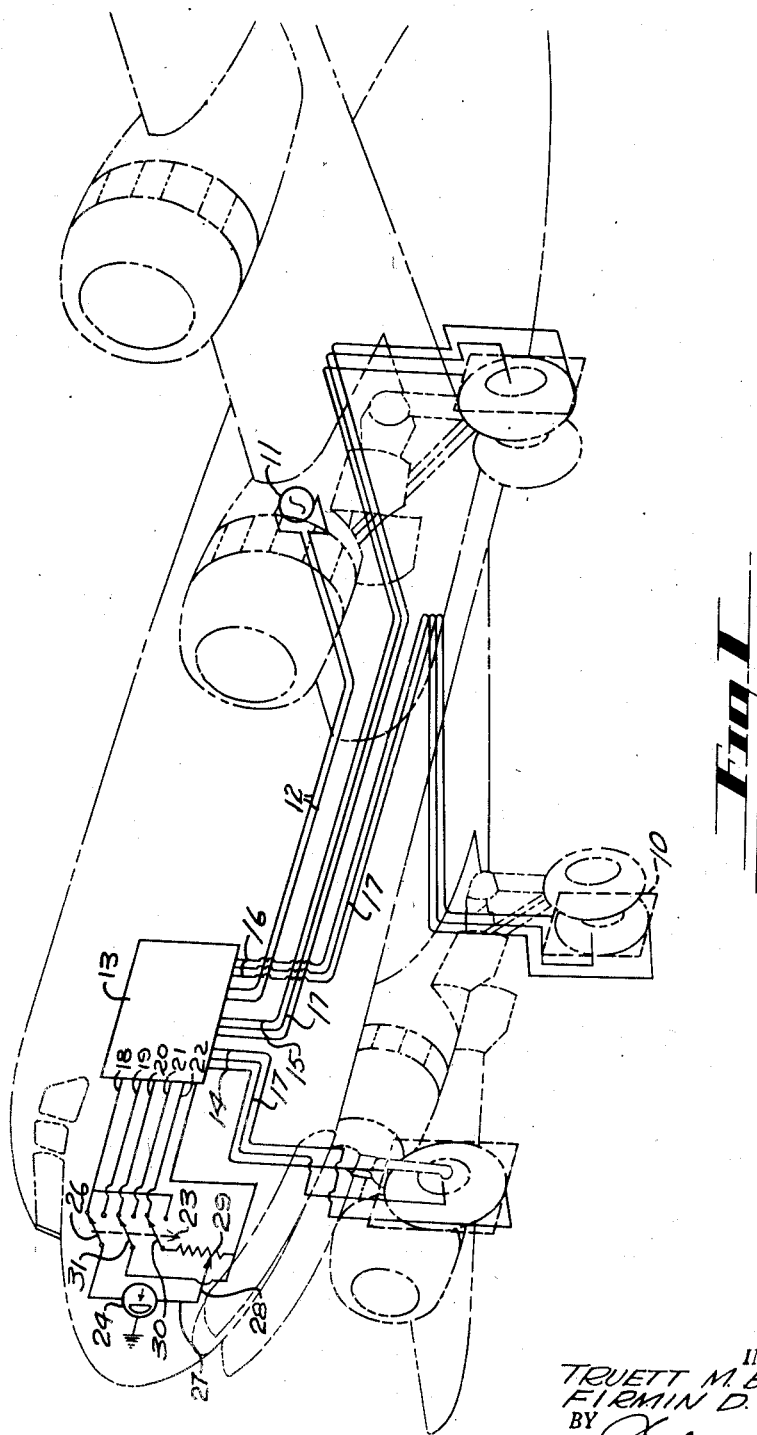
Figure 1 is a fragmentary perspective of an airplane, diagrammatically illustrating the general arrangement therein of the presently preferred embodiment of the invention.

The invention will be exemplified in connection with its employment with a transport airplane having tricycle landing gear, and in its broad aspects, it is primarily predicated upon electrically measuring the deflections of the axles of the tricycle landing gear thereof, induced by increments of loading of the airplane. Preferably, the invention involves the employment of displacement devices associated with the axles and with balanced bridges adapted to be unbalanced by loading-induced deflections of the axles to impress voltages in summation or in ratio upon coordinated indicating devices adapted to indicate either the total loading, or the longitudinal position of the center of gravity, of the airplane.

In such embodiment, the general arrangement comprises electromagnetic displacement devices 10, one of these devices being associated with the axle of each landing wheel, the devices being electrically connected in parallel with each other and with the airplane's source of electrical energy 11. The connections comprise an operating circuit 12 leading from the energy source to a junction box 13, from which respective feeder circuits 14, 15, and 16 lead to the respective electromagnetic devices. Conductors 17, associated with bridge balancing and transformer coupling means, hereinafter detailed, also extend from the respective electromagnetic devices to the junction box.

The location of the junction box is a matter of preference, but can be advantageously situated in the baggage compartment just aft of the pilot's compartment. If desired, however, it may be advantageously located in the pilot's compartment.

From junction box 13, conductors 18, 19, 20, 21 and 22, respectively, associated with the respective bridges in a manner hereinafter described, lead forwardly to a three-pole, double throw switch 23 provided to enable connecting the indicating means 29 and 24, later detailed, into two different circuits with the bridges, in a manner hereinafter particularized, for respectively indicating the two different sets of loading conditions of the aircraft that the invention proposes to ascertain.

Figure 2:
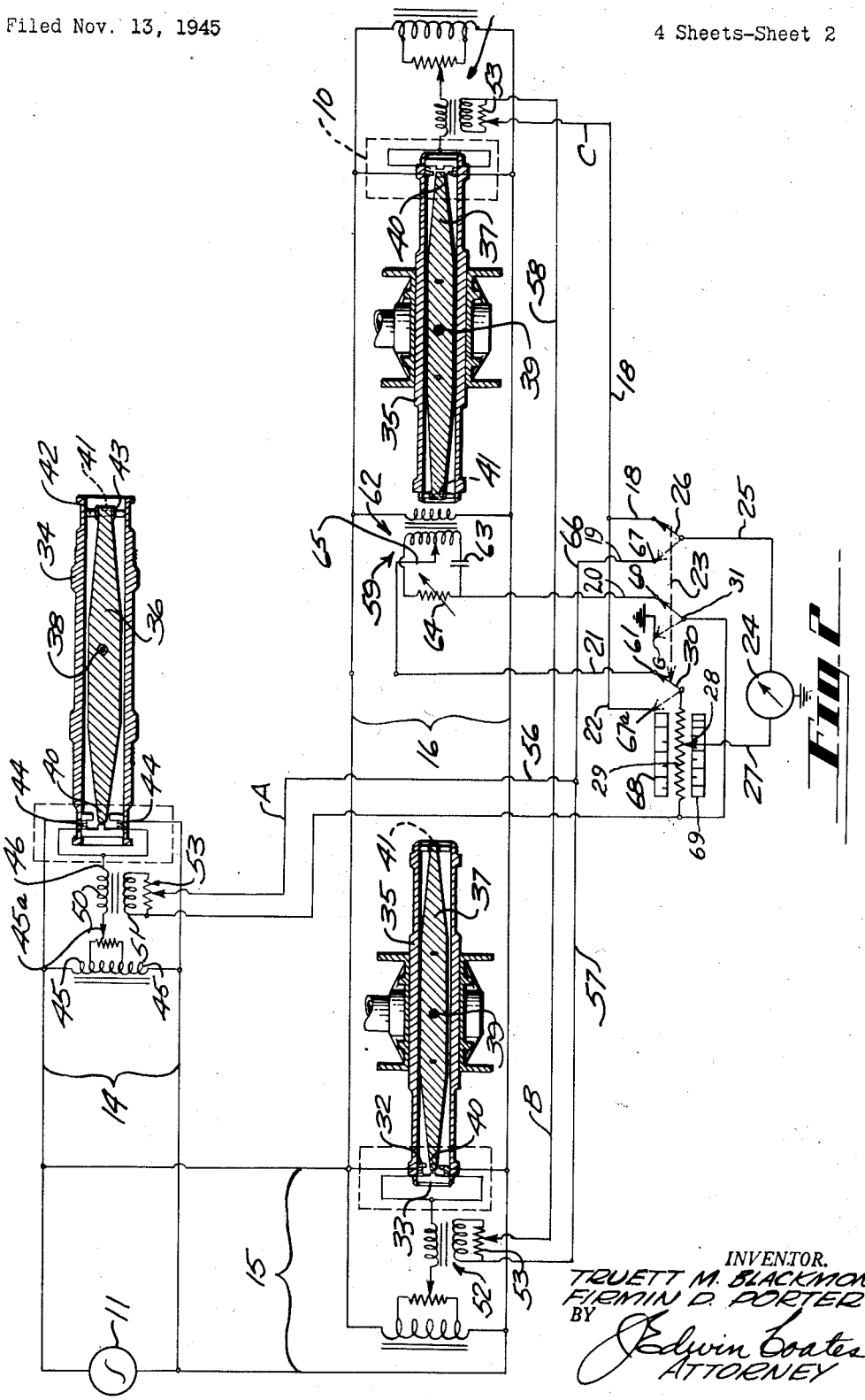
Figure 2 is a diagrammatic view of the apparatus showing the axles of the aircraft, and one form of displacement device therein in longitudinal section and illustrating respective circuits actuated thereby for alternatively integrating or comparing the bridge outputs.

Switch 23 may be situated either in the pilot's compartment or in the baggage compartment, as desired. The indicating means 24 may consist of a simple A. C. null-point meter, a dynamometer type volt meter, a rectifier type d'Arsonval movement, a ratiometer, or, in cases where greater sensitivity may be required, a simple A. C. vacuum tube volt meter, electrically preceded by an amplifier. In any case, this meter is connected, at its weight-variable input side, to a pole 26 of the switch 23, the other side of the volt meter being connected by means of a conductor 27 and a variable contact 28 with an A. C. potentiometer 29 of the rotary slide wire type. As is later particularized, the slider of this potentiometer is mechanically coupled by respective actuating couplings to respective indicating dials for separately indicating the total loadings and the center of gravity position, of the airplane, as shown in Figure 2. The slide wire of the potentiometer is connected at one end to a switch pole 30, the other end of the slide wire being connectible to one side of the energy source. A switch pole 31 is adapted to supply energy thereto from the energy source when the switch is in its full line or rightward position.

Each of the displacement devices indicated within the broken line rectangle 10 preferably comprises a balanced, variable-impedance electromagnetic strain gauge 32, shown in Figure 2. The yokes or cores 33 of these electromagnetic displacement gauges are, as shown in Figure 2, fixedly attached to the inside of one end of each of the axles of the respective landing wheels. In the transport airplane chosen for illustrative purposes, the tricycle landing gear includes a nose wheel axle 34 and main wheel axles 35. These axles are of the kind adapted to flex upwardly immediately upon increments of loading of the airplane and continue flexing upwardly in direct proportion to these increments, in a linear manner.

However, it is to be understood that these yokes may equally well be attached to any other structural member of the landing gear that also undergoes immediate deflection in direct and linear proportion to increments in the weight loading on this structural member.

The armatures of the electromagnets of these displacement devices preferably take the form of elongated beams 36 and 37 pivotally mounted to the unloaded, or substantially rigid, portions of the nose wheel, and the main wheel, axles, respectively. Since, in the airplane type shown, the nose wheel axle is asymmetrically loaded, a pivot 38 of the beam 36 in the nose wheel axle, is preferably located at a point laterally displaced from the longitudinal center of both the beam and the axle, for reasons hereinafter particularized, whereas the pivots 39 of the beams 37 in the main wheel axles coincide with the longitudinal centers of both the beam and the axle.

Each of the beams includes a laminated extremity 40 that extends into juxtaposition with its corresponding electromagnetic yoke. For the purpose of neutralizing the effects of the thermally-induced variations of the length of the beam upon the air gap and hence upon the magnetic field of the electromagnet, the ends 40, in the horizontal plane, may be bent substantially at right angles to the longitudinal axis of the remainder of the beam, and the thus bent end lies between the pole piece of the yoke.

Figures 3, 4:
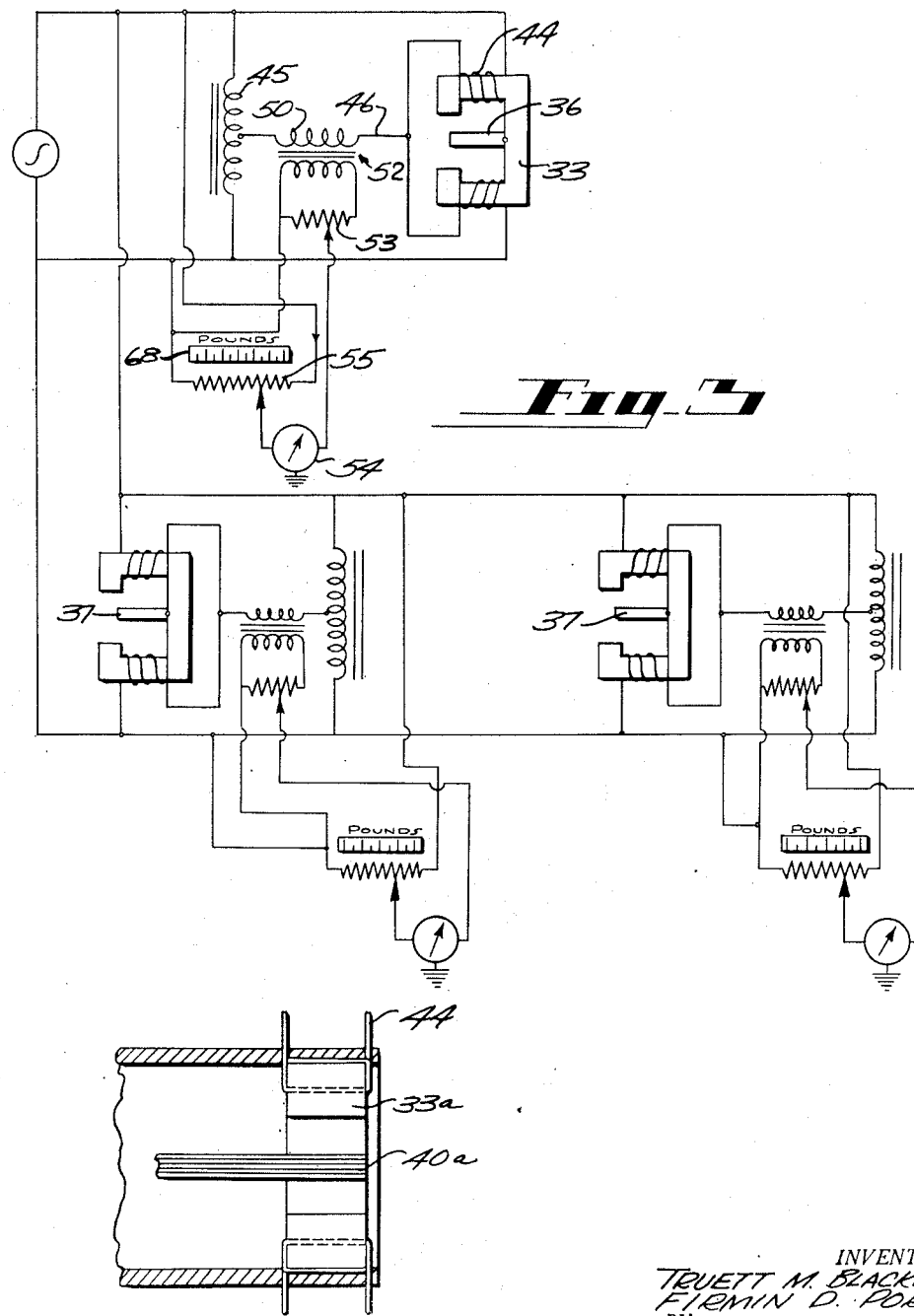
Figure 3 is a diagrammatic view of a modification showing circuits for enabling individual comparison of the loading on each landing leg.
Figure 4 is a fragmentary detailed view of an axle showing a modified arrangement of the fixed and the movable members of the displacement device adapted to compensate for thermal expansion.

These thermally-induced effects may also be anticipated and compensated for in the manner shown in Figure 4, wherein the yokes 33a are mounted in the axles at right angles to the position they occupy in Figure 2. The yokeward ends 40a of the beams, in this instance are laminated and constructed of a uniform cross-section throughout their lengths, this section preferably being that of a square. The two halves of each yoke are symmetrical, so that thermally induced changes of yoke dimensions affect both air gaps equally and hence cause no unbalance of the bridges. Expansion and contraction of the beams thus has no effect upon the size of the air gaps and hence thermal influences effect no detrimental changes in the magnetic field. Constancy of performance of the electromagnet under all climatic or altitudinous conditions is thus obtained.

In either instance, the other end of each of the beams bears an aperture 41 through which extends the shank of an adjusting screw 42 bearing adjusting nuts 43 by means of which the disposition of the ends 40 may be altered upwardly or downwardly, that is longitudinally of the yokes, to vary the air gaps and the magnetic fields of the yokes, for a purpose hereinafter particularized.

In each main wheel 35, the weight of the airplane and its load is applied at the bottom of the axle and the ground reaction deflects both ends of the axle upwardly. Although the loading of the nose wheel in this particular type of airplane is asymmetric, both ends of this axle 34 are also deflected upwardly. Each of the beams is adapted to add the deflections occurring at the respective ends of the axles and refers the sum to the yoke end of the axle. As a consequence, only one gauge is required in each axle.

Each horizontal arm of each pick-up yoke is provided with an impedance coil 44, the reactance of each yoke being balanced yet variable, the respective yokes being connected in series to the source of energy by conductor paths 14, 15, and 16. Each of the circuits 14, 15, and 16 includes a reactor 45 connected in parallel across the conductor path and connected in divided circuit by a mid-point tap 45a to the connected impedance coils 44. The construction and arrangement of parts establishes, in association with each axle, a balanced, variable-impedance bridge, composed, in the illustrative embodiment shown, of the yoke 33 and coils 44, the conductor 46 and the dummy reactor 45 with variable center tap resistor 45a, the electromagnet constituting one-half of the bridge.

Figure 5:
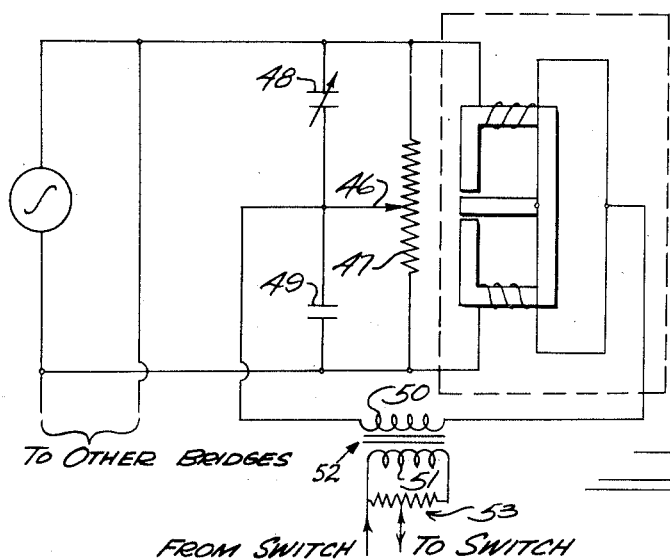
Figure 5 is a fragmentary diagrammatic representation of optional means for resistively and reactively balancing each bridge.
Figure 6:
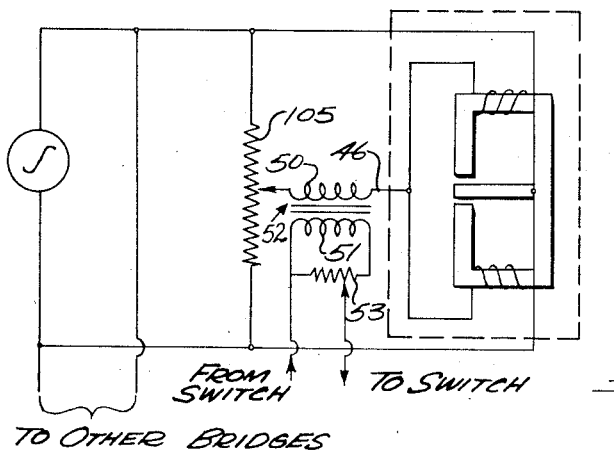
Figure 6 is a fragmentary diagrammatic view of another optional means for resistively and reactively balancing each bridge.

Reactive and resistive balance of each bridge is then preferably maintained by adjusting the nuts 43 at the end of each beam. The consequent variation in the disposition of the opposite ends 40 of the beams within the yoke, varies the air gap thereof and hence effects, through an alteration of the magnetic flux, an adjustment of the impedance in the impedance coils in such manner as to reestablish the balance of the unbalanced bridges. Resistive balance is maintainable in each bridge by suitable adjustment of the mid-point tap of the resistor 45a. However, the invention contemplates that, in cases where such may be found desirable, as shown in Figure 5, a variable potentiometer 47 and series connected variable and/or fixed capacitators 48 and 49 respectively, may be connected across the supply buses to the input side of the impedance coils of each bridge. In this case, potentiometer 47 is variably tapped and series connected to the output side of the impedance coils, by a conductor 46, through the capacitator circuit. This arrangement provides both resistive and reactive balance in the bridge. Reactive and resistive balance of each bridge may also be attained, as shown in Figure 6, by mechanically balancing the armature of each displacement gauge with the adjusting screws described and employing a resistive potentiometer like the one designated by numeral 105, 105 in the manner shown.

In either instance, the conductor 46 is rendered integral with a primary induction coil 50, which is inductively associated with a secondary induction coil 51, the two together establishing a transformer 52.

In order to enable equalization of the voltage outputs of the secondaries for equal increments of airplane loading, each secondary induction coil 51 includes a sensitivity equalizer or adjustable potentiometer 53 connected in parallel across the output terminals thereof. Respective conductor paths A, B, and C lead from the respective sensitivity equalizers toward the switch 23, volt meter 24, and indicating devices 68 and 69 in a manner and for a purpose hereinafter particularized.

The illustrated mode of taking off the voltage outputs of the bridges, while replaceable by equivalent modes, is the preferable form, as it enables mixing the bridge outputs in an easy manner to facilitate ascertaining both the loading and the center of gravity position of the airplane, by simple indicating devices and by a relatively small number of circuits thereto. This arrangement also enables the employment of sensitivity equalizers which, after the adjustment to the same absolute sensitivity in each bridge, may be hermetically sealed and remain without recalibration or other attention for long periods of time.

In the preferred embodiment all components of the bridges save the displacement gauges, the reactors, and the transformer couplings, are advantageously locatable in the junction box 13.

Although it is preferable to employ a transformer coupling to take-off the voltage outputs of the bridges, the invention also contemplates the employment in their stead in each bridge, as shown in Figure 3, of a separate sensitive null-point volt meter 54 and a rotary slide wire potentiometer 55 for individual indication of the loading-induced output of each bridge. The three readings may either be added by the pilot or freight master, or compared in ratio by him to determine either the total loading, or the center of gravity position, of the airplane.

By the aforesaid manipulation of the adjusting nuts and the reactor taps aforedescribed, the bridges are adapted to be brought into a balanced condition at the inception of the loading operations. Thus, the bridges at this juncture, that is, when the airplane is in the empty condition, produce zero output voltage. As the loading operations proceed, however, increments of load effect axle deflections, causing relative movement of the beams with respect to their yokes and varying the air gaps thereof. The resultant change in the magnetic fluxes of the electromagnets alters the impedance to the alternating current in the two impedance coils of each electromagnet in opposite directions and unbalances the bridge. A voltage is thereby impressed upon the primary of each coupling transformer in each bridge. If the switch 23 then occupies its rightward position, shown in full lines in Figures 1 and 2, the voltage output from the sensitivity equalizer of the nose wheel bridge is thereby impressed, via the conductors 56 and 57, upon the sensitivity equalizer 53 of the left hand main wheel, as shown in Figure 2. The compounded voltages lead therefrom through a conductor 58 to the sensitivity equalizer 53 of the right main wheel and thence through conductor 18 to the pole 26 of switch 23. Equal voltage outputs and equal increments of loading are assured by adjustment of the adjustable contacts of the sensitivity equalizers in the manner aforedescribed.

The phase of the voltage applied from the energy source to the slide wire is to be shifted in such manner as to throw it into phase with the otuputs from the gauges, when any type of mentioned meter 24 except a ratiometer, is employed. To this end, a phase-shift network generally designated in Figure 2 by reference numeral 59 has its input side connected in parallel with the common supply busses for all the bridges and its output end connected in series with switch contacts 60 and 61. The network chosen for purposes of exemplification includes a transformer 62, the primary of which is connected directly across the supply busses, the secondary thereof including a capacitor 63 and a variable resistor 64 and in divided circuit with contact 60 of the switch. A mid-point tap 65 is associated with the secondary of the transformer and is connected to contact 61 of the switch.

Regardless of the particular type of phasing means employed, with switch 23 in the rightward position, the voltage outputs of the three coupling transformers are added in phase at the weight-variable input side of the sensitivity meter 24, the sum being directly proportional to the loading of the airplane at any given stage of the loading operations.

With these relationships establishable in this manner, in order to ascertain the total loading of the airplane it is only necessary to place switch 23 in its rightward position and to manipulate the slider of the rotary slide wire potentiometer, or its equivalent resistance device, to null the reading of the null-point meter 24. The loading of the airplane or other vehicle can then be directly read from a dial 68 calibrated in pounds and mechanically coupled to the slider of the slide wire in the manner customary in these conventional indicating devices.

With switch 23 in its leftward position, shown in dotted lines in Figure 2, voltage induced in the sensitivity equalizers 53 of the nose wheel bridge is impressed, singly, upon contact 67 of switch 23 through conductors 56 and 66, designated together as 19 in Figure 1. Thence this voltage is applied through conductor 25 to the weight-variable input side of the volt meter 24. At the same time the center switch arm is disconnected from contact 60 and contacted with the ground pole G, switch pole 30 occupies a disconnected position with reference to the supply line 21 from the energy source and is now connected with contact 67a of the switch. The slide wire 29 is thereby disconnected from the energy source (to which it was initially connected via the phase-shifting means 59) and connected to the voltage from the bridge of the left hand wheel and from the bridge of the right main wheel via conductor 22. The compounded voltages are applied through contact 28 and conductor 27 to the resistance-variable input side of the meter 24.

With the circuits in this relationship, the rotary slide wire 29 is constituted a potentiometer with reference to the outputs of the nose wheel bridges and the main wheel bridges. When the potentiometer 29 is so adjusted as to null the volt meter, the pointer 28 will indicate the ratio between the sum of the outputs of the main wheel bridges and the output of the nose wheel bridge.

To ascertain the longitudinal position of the center of gravity of the airplane as a percentage of the mean aerodynamic chord, switch 23 is readily shifted to its leftward position, and the rotary slide wire is adjusted to null the volt meter. The position of the pointer 28 with respect to a dial 69, calibrated in percentage of the mean aerodynamic chord and also separately mechanically coupled to the slider of the slide wire, gives a direct indication of the longitudinal position of the center of gravity. Dial 69 is preferably calibrated with respect to the specific loading moments of the airplane and bears suitable marking indicating the safe loading limits of the airplane for maintaining stability.

Adjustment of the slider of the potentiometer 29 in nulling the volt meter 24 does not balance the bridges. It is therefore preferable that each gauge be constructed to have identical non-linearities of performance; or, more preferably, that they operate linearly over the entire range. With either of these conditions, it is advantageous to include a sufficient amount of molybdenum permalloy in each yoke to maintain the permeability of its iron circuit constant over all temperature conditions.

With the longitudinal centers of the main wheel beams located, as described, concentrically with the longitudinal center of their corresponding axles, uneven footing of the tires of the dual main wheels, although inducing variations in tire loads, will have no appreciable effect upon the deflections of the beams. For types of airplanes in which the nose wheel axle is asymmetrically loaded, the location of the fulcrum of the beam of the nose wheel displacement gauge at a point laterally offset from the center of both the beam and the axle, is highly advantageous in that it maintains the total deflections of the beam, referred to the yoke, substantially independent of side loads on the nose landing leg. In addition, relatively minute deflections of the axle produce, in such an arrangement, relatively large deflections of the beams, rendering the device sensitive to the slightest change of loading of the aircraft.

As manifested, the present invention is not limited to that embodiment in which the displacement device in the bridge is an electromagnetic type of strain gauge. However, such type is preferable for many reasons, among which is the fact that electromagnetic displacement devices of the present type have an effectively much longer gauge length than other types and hence will discern a smaller increment of loading than such devices as the resistance wire type of strain gauge.

The invention, as should now be clear, is also not limited to the employment therewith of a null-point volt meter and rotary slide wire to electrically measure the axle deflections in the manner aforedescribed, inasmuch as a direct reading galvonemeter may be employed for this purpose if desired. However, the employment of the present null-point type of volt meter and rotary potentiometer is quite advantageous, inasmuch as a null-point volt meter permits a very wide swing of the needle, enabling a high degree of accuracy in indicating the bridge-ratio set up thereat in determining the position of the center of gravity.

Many refinements and ramifications of the preferred embodiment are included within the scope of the inventive concepts. For instance, instead of being located as shown in Figure 1, all the components of the apparatus except the displacement gauges and the energy source, may be located at one and the same station in the airplane. That is, the junction box, switch, sensitivity meter, and rotary slide wire may be all located together either in the baggage compartment, for the convenience of the freight master, or in the pilot's compartment to enable him to supervise loading operations.

We claim:

1. Apparatus for indicating the longitudinal position of the center of gravity of a vehicle, comprising: forward and rearward ground-engaging means having forward and rearward deflectable means adapted to deflect in proportion to the vertical loads on said ground-engaging means; means forming a first normally balanced bridge circuit; means forming a second normally balanced bridge circuit; means to supply electrical energy to said bridge circuits; strain-gauge means forming the one half of said first bridge circuit and operatively associated with each deflectable means on a portion thereof flexural in direct, linear proportion to vehicle loading; conductor means connecting substantially the mid-points of the opposite electrical halves of said bridge, said means including a primary induction coil; a secondary induction coil operatively associated with said primary coil and having a fixed contact at the one end thereof and a variable-position contact intermediate its ends; conventional null-point indicator means having an index and an index-actuating internal circuit that terminates at opposite sides of the indicator in a single-voltage receiving terminal and a summation-voltage receiving terminal; resistor-means; sliding-means contacting said resistor means and including a conductor connected thereto and to said summation-voltage receiving terminal; index means graduated to indicate longitudinal positions of the center of gravity of the vehicle, said index means being arranged operatively adjacent said sliding-means; an electrical conductor path extending from connection with the variable-position contact in the forward ground-engaging means, and said conductor path extending back to connection to said fixed contact and defining an electrical circuit including electrical path-opening and closing means therein, said circuit passing connectedly from said variable-position contact on said secondary coil to said single-voltage receiving terminal on said indicator and through said indicator, and passing connectedly therefrom to said sliding-means and through said resistor and outwardly through that terminal thereof that lies adjacent to the aforesaid return-portion of said conductor path, thereby to apply to the first-said indicator terminal, voltage induced in said secondary coil by unbalance of said bridge incident to increments in vehicle loading; an electrical conductor path leading from connection with the variable-position contact on the secondary induction coil on a selective one of the rearward ground-engaging means back to connection with the fixed contact of the last-said coil, said conductor paths defining an electrical circuit having electrical path-opening and closing means therein, said circuit passing connectedly from said variable position contact on said coil on said selective ground-engaging means to that terminal of said resistor that lies opposite on said resistor to the conductor path that returns said energy to said fixed connection in said selective ground-engaging means; and said circuit passing connectedly from said resistor terminal through said sliding-means to said summation voltage receiving terminal of said indicator, thereby to apply the summation of the voltages in said other group of ground-engaging means to the summation-voltage receiving terminal of said indicator; whereby, when said path-opening and closing means are closed and said sliding-means adjusted on said resistor to cause equalization of the voltages applied respectively to the respective terminals of said indicator, the relative positions of said sliding-means and said index indicate the longitudinal position of the center of gravity of the vehicle.

2. In a vehicle having an energy source and having at least one forwardly disposed ground-engaging means and a relatively rearwardly disposed group of ground-engaging means, each ground-engaging means including a deflectable means adapted to deflect in proportion to the vertical load on said ground-engaging means; a system associated with said ground-engaging means and with said energy source for indicating the longitudinal position of the center of gravity of the vehicle, said system constituting a four-arm, normally unbalanced electrical bridge adapted to be balanced to indicate the center of gravity location; said bridge incorporating respective ones of said deflectable members in the respective arms of the bridge, said four-arm bridge system including: two electrically opposed main bridge arms, the one of said main bridge arms including subordinate two-arm, normally balanced bridge means located on said forwardly disposed ground-engaging means, one of the arms of each of said subordinate bridge means including a strain gauge of the variable reluctance type disposed adjacent the corresponding deflectable member; said gauge including means connected to said source to create a magnetic field operatively intersecting a movable portion of said deflectable member; complementary bridge means disposed operatively adjacent said field-creating means and connected to said source to complete the arms of said two-arm bridge; bridge-circuit completing means connecting said arms for transmitting voltage between said arms when the bridge is unbalanced; said bridge circuit-completing means including primary induction means; secondary induction means disposed in inductive relationship to said primary induction means for transducing voltage from said two-arm bridge when said bridge is unbalanced; a conductor path having its one terminal position-variably contacting the secondary induction means in the relatively forwardly located two-arm bridge, said conductor path terminating at its opposite end in a contact member; the other main arm of said four-arm bridge system including a plurality of subordinate bridge-means located on said rearwardly disposed ground engaging means, one of the arms of each of said subordinate bridge-means including a strain gauge of the variable-reluctance type disposed adjacent the deflectable member in each rearwardly located ground-engaging member; each of said gauges including means connected to said source to create a magnetic field intersecting a movable portion of each of the rearwardly located deflectable members; complementary bridge means disposed operatively adjacent said field-creating means and connected to said source to complete the arms of said two-arm bridge; bridge circuit-completing means connecting said two arms in each of said rearwardly located ground engaging means for transmitting voltage between said arms when the bridge is unbalanced; said bridge-circuit completing means including primary induction means electrically integral therewith; secondary induction means disposed in inductive relationship to said primary induction means for transducing onwardly the voltage induced in said secondary induction means when said bridge is unbalanced; a conductor path having its one terminal position-variably contacting the secondary induction means in a first one of the relatively rearwardly located ground engaging means; secondary induction means common to the bridge means of the remainder of said relatively rearwardly located ground engaging members; the last said conductor path being fixedly connected at its other end with said common secondary induction means; a resistance member having its one terminal disconnectibly connected to the summated induced voltages emanating from the rearwardly located common secondary induction means and having its opposite terminal fixedly connected to that end of the secondary induction means of said forwardly located bridge means that lies opposite to those means which position-variably contact said secondary induction means; a slider member movably contacting said resistance means; a scale operatively associated with said slider and graduated to indicate longitudinal positions of the center of gravity of the vehicle; a null-point indicator of the conventional biterminous-coil, magnet-actuated type, said indicator having externally located first and second terminals, said first terminal being connected to said slider and connectible through the second-said conductor path to the summated induced voltages from said rearwardly located bridge means, said second terminal of said indicator being connected to that conductor path which connects that member which position-variably connects the secondary induction means of said forwardly located bridge means to the fixed connection of the first one of said rearwardly located bridge means; whereby movements of said slider over said resistance element until said indicator is nulled effects balance of said overall four-arm bridge system and concurrently indicates on said scale the longitudinal position of the center of gravity of the vehicle.

3. Apparatus for indicating the longitudinal position of the center of gravity of a vehicle having forward and rearward ground-engaging means and having forward and rearward deflectable means adapted to deflect in proportion to the vertical load on said ground-engaging means, comprising: means forming a first normally balanced bridge circuit; means forming a second normally balanced bridge circuit; means to supply electric power to said bridge circuits; strain gauge means forming the one half of said first bridge circuit gauge-means including electrical means deflectibly carried by said deflectible means for varying the voltage in said arm and unbalancing said bridge; means electrically connecting the electrical halves of said bridge; means transductively associated with the first means and adapted to transmit onwardly the voltage induced therein by the unbalancing of said bridge; null-point indicating means having electrically opposed external terminals connected to an internal indicator-actuating circuit; variable resistor means having electrically opposed terminals and including voltage-tapping means movable contacting same; scale-means for indicating the longitudinal position of the center of gravity of the vehicle, disposed operatively adjacent the movable voltage-tapping means; conductor paths defining an electrical circuit connectedly passing the induced voltage from the transducer means of the one of said groups of ground-engaging means to the one of said terminals on said indicator and therethrough and back through said resistor means to said transducer means until the indicator is nulled; and conductor paths defining an electrical circuit passing the summation of the voltages from the transducer means of the other of said groups of ground-engaging means to the other of said opposed indicator terminals and therethrough and back to the last said transducer means; whereby movements of said movable voltage-tapping means in contact with said resistor until said indicator is nulled indicates the longitudinal position of the center of gravity of the vehicle.

4. Apparatus for ascertaining the longitudinal position of the center of gravity of a vehicle having a source of electrical energy, comprising: at least two longitudinally separated groups of ground-engaging means, each ground-engaging means including deflectable means adapted to deflect in proportion to the vertical load on said ground-engaging means; each of said deflectable means being operatively associated with voltage-unbalance generating means arranged thereon to respond directly and linearly to loading-induced deflections of said deflectable means; transducer means forming a part of the internal circuit of each of said voltage-unbalance generating means and adapted to transmit onwardly the voltage induced therein by said voltage-unbalance; electrical null-point indicating means having an internal circuit adapted for positioning the indicator of said indicating-means at the null point, said circuit terminating oppositely in a relatively high-energy receiving terminal and a relatively low-energy receiving terminal; resistor means arranged and adapted for varying the voltage applied to the high-energy receiving terminal of said indicator; energy-tapping means movably contacting said resistor means and energy-flow connected to said high-energy receiving terminal; scale means graduated to indicate longitudinal positions of the center of gravity of the vehicle operatively associated with said movable tapping means; conductor paths defining an electrical circuit connectedly passing the induced energy from the one terminal of the transducer means in the one of said groups of ground-engaging means to the low-energy input terminal of said indicating means and onward through said tapping means and resistor to the other terminal of said transducer means, with the indicating means annulled; and conductor paths defining an electrical circuit connectedly passing the energy induced in the several transducer means of the other of said groups of ground-engaging means from the one terminal of a selective one of the transducer means of the other of said groups of ground-engaging means to the high-energy terminal of said indicating means in ratio to the energy applied to the opposite terminal, said ratio being proportional to the vehicle's center of gravity location, said energy passing from the last-said terminal through said indicating means to the other terminal of said transducer means of the other of said groups of ground-engaging means; whereby when said indicating means are nulled, the location of the movable member of said movable tapping means with respect to said scale means indicates the longitudinal position of the center of gravity of the vehicle.

5. Apparatus for indicating the center of gravity of an aircraft having forward and rearward ground engaging means and having forward and rearward deflectable means adapted to deflect in proportion to the vertical load on said ground engaging means, comprising: means forming a first normally balanced bridge circuit; means forming a second normally balanced bridge circuit; means to supply electric power to said bridge circuits; a variable reluctance electromagnetic strain gauge forming the one half of said first bridge circuit and including an armature movable in proportion to the deflection of one of said deflectable means to unbalance said bridge circuit and produce a voltage inductively transmittable from said circuit; a null-point voltage indicator having a first and a second voltage input terminal and having means forming an internal circuit connected between said terminals; variable resistor means having electrically opposed terminals and including voltage-tapping means movably contacting same; means, including the internal circuit of said indicator, said voltage-tapping means, and a first portion of said resistor, forming a conductor path to conduct the voltage induced in said first bridge circuit to the first input terminal of said indicator; a variable reluctance electromagnetic strain gauge forming the one half of said second bridge circuit and including an armature movable in proportion to the deflection of the other of said deflectable means to unbalance said bridge circuit and produce a voltage inductively transmittable from said circuit; means, including the internal circuit of said indicator, said voltage-tapping means, and the remaining portion of said resistor, forming a conductor path to conduct the voltage induced in said second bridge circuit to the second input terminal of said indicator; and means to vary the position of said voltage-tapping means to null said indicator; the adjusted position of said voltage-tapping means when said indicator is nulled serving to indicate the location of the center of gravity of said aircraft.

6. Apparatus for indicating the center of gravity of an aircraft having forward and rearward ground-engaging means, comprising: first deflectable means to support the aircraft at a region ahead of the center of gravity of the aircraft; second deflectable means to support the aircraft at a region to the rear of said center; means forming first and second normally balanced bridge circuit means; means to supply electric power to said bridge circuit means; electrical strain gauge means forming the one half of each of said bridge circuit means and operable in proportional response to the deflection of said forward and rearward deflectable means respectively to unbalance their respective bridge circuits and produce voltages inductively transmittable therefrom; a null-point voltage indicator having a first and a second voltage input terminal and having means forming an internal circuit connected between said terminals; means, including the internal circuit of said indicator, forming a conductor path to conduct the voltage induced in said first bridge circuit means to said first input terminal of said indicator; means, including the internal circuit of said indicator, forming a conductor path to conduct the voltage induced in said second bridge circuit means to said second input terminal of said indicator; and variable resistor means, including movable voltage-tapping means, forming a part of at least one of said conductor paths to adjust the voltage transmitted to at least one of said terminals to null said indicator; the adjusted position of said voltage tapping means when said indicator is nulled serving to indicate the location of the center of gravity of said aircraft.

7. Apparatus for indicating the center of gravity of an aircraft having forward and rearward ground-engaging means, comprising: first deflectable means to support the aircraft at a region ahead of the center of gravity of the aircraft; second deflectable means to support the aircraft at a region to the rear of said center; means forming first and second normally balanced bridge circuit means; each of said bridge circuit means including a first electrical half, a second electrical half in the form of strain gauge means, and a transducer electrically connecting said electrical halves; means to supply electric power to said bridge circuit means; each of said strain gauge means being operable in proportional response to the deflection of said forward and rearward deflectable means respectively to unbalance their respective bridge circuits and produce voltages in their respective transducers inductively transmittable therefrom; a null-point voltage indicator having a first and a second voltage input terminal and having means forming an internal circuit connected between said terminals; means, including the internal circuit of said indicator, forming conductor paths to conduct the voltage induced in said first bridge circuit means to said first input terminal of said indicator and to conduct the voltage induced in said second bridge circuit means to said second input terminal of said indicator;

and movable means to adjust the relative values of said conducted voltages to equality in order to null said indicator; the adjusted position of said movable means when said indicator is nulled serving to indicate the location of the center of gravity of said aircraft.

8. Apparatus for ascertaining the longitudinal location of the center of gravity of a vehicle having a source of voltage and having a group of ground-engaging means disposed ahead of the center of gravity of the vehicle and a group of such means disposed behind said center, each of said means including deflectable means adapted to deflect in proportion to the vertical load thereon; voltage-unbalance generating means operatively associated with each of said deflectable means and connected with said source, said generating means including an electrical arm actuated to generate voltage-unbalance by, and in direct proportion to, deflections of said deflectable means; means connected to said arm for receiving said voltage unbalance, said last means including a transductive portion for transmitting said voltage-unbalance onwardly; null-point indicating means having electrically opposite external terminals and having an internal circuit series-connected to said terminals; resistor means having a movable tapping-contact thereon; scale means graduated to indicate longitudinal positions of the center of gravity of the vehicle operatively associated with said movable tapping means so as to cause the location of said tapping means to index said scale-means; conductor paths defining a series circuit for induced voltage from the transductive means of the one of said groups of ground engaging means through said null indicating means and in series through said tapping means and resistor back to said transductive means; and conductor paths defining a series circuit for induced voltage from the transductive means of the other of said groups of ground engaging means in series through said resistor and tapping means and through said indicating means in opposing ratio to the first said induced voltage and back to the second-said transductive means; whereby the nulling position of said movable tapping means with respect to said scale means indicates the true longitudinal position of the center of gravity of the vehicle.

TRUETT M. BLACKMON.
FIRMIN D. PORTER.

REFERENCES CITED

The following references are of record in the file of this patent:

UNITED STATES PATENTS

| Number | Name | Date |
|---|---|---|
| Re 14,475 | Troll | May 21, 1918 |
| 1,407,078 | Murray | Feb. 21, 1922 |
| 2,231,702 | Burgwin et al. | Feb. 11, 1941 |
| 2,336,371 | Shayne et al. | Dec. 7, 1943 |
| 2,373,504 | Schlieben et al. | Apr. 10, 1945 |
| 2,394,079 | Langer et al. | Feb. 5, 1946 |
| 2,443,045 | Magruder et al. | June 8, 1948 |
| 2,443,098 | Dean | June 8, 1948 |
| 2,453,607 | Wardle et al. | Nov. 9, 1948 |